Aug. 6, 1940.   H. R. HAGEN   2,210,716
HEATING APPARATUS
Filed April 8, 1938   3 Sheets-Sheet 1
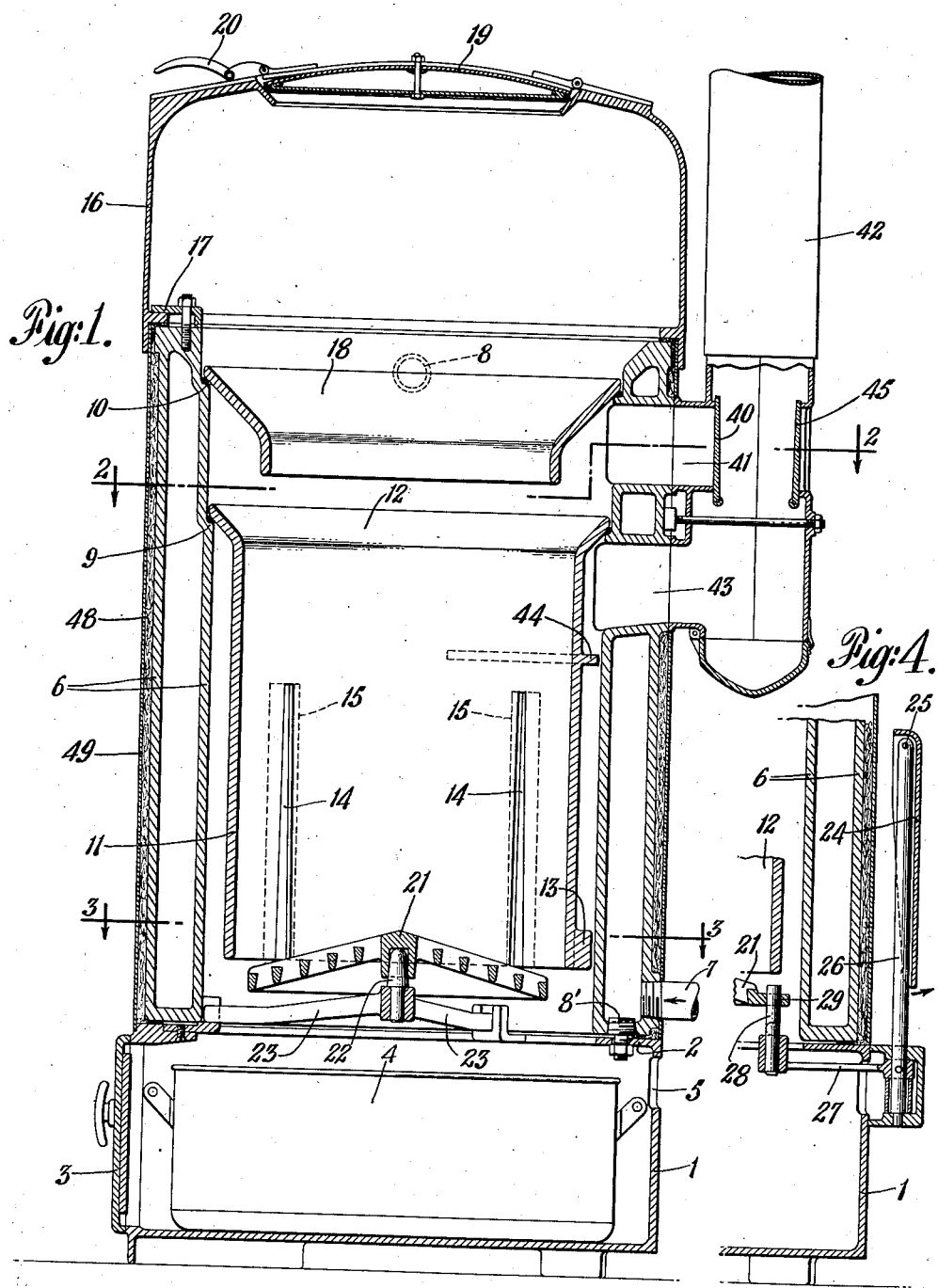
INVENTOR
HILMAR R. HAGEN
BY
E. C. Sanborn
ATTORNEY Aug. 6, 1940.  H. R. HAGEN  2,210,716
HEATING APPARATUS
Filed April 8, 1938  3 Sheets-Sheet 2
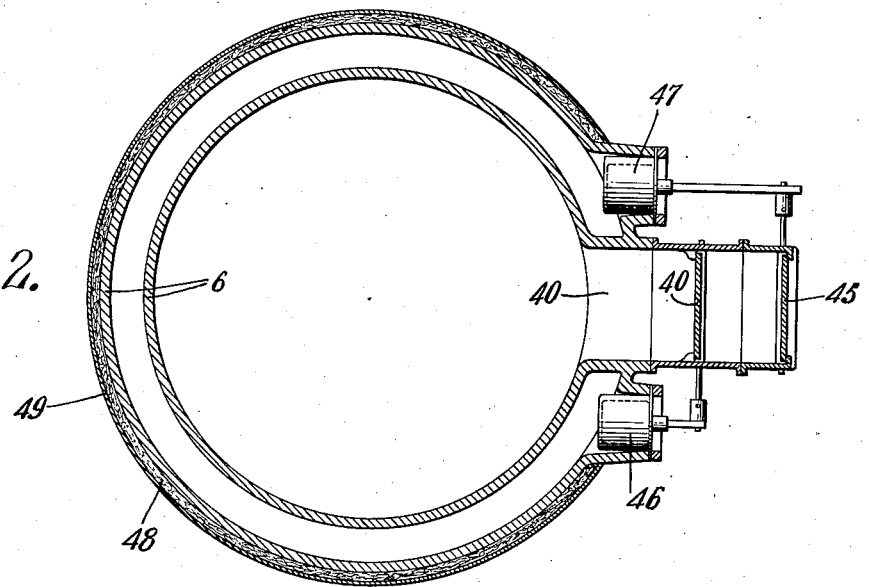
Fig: 2.
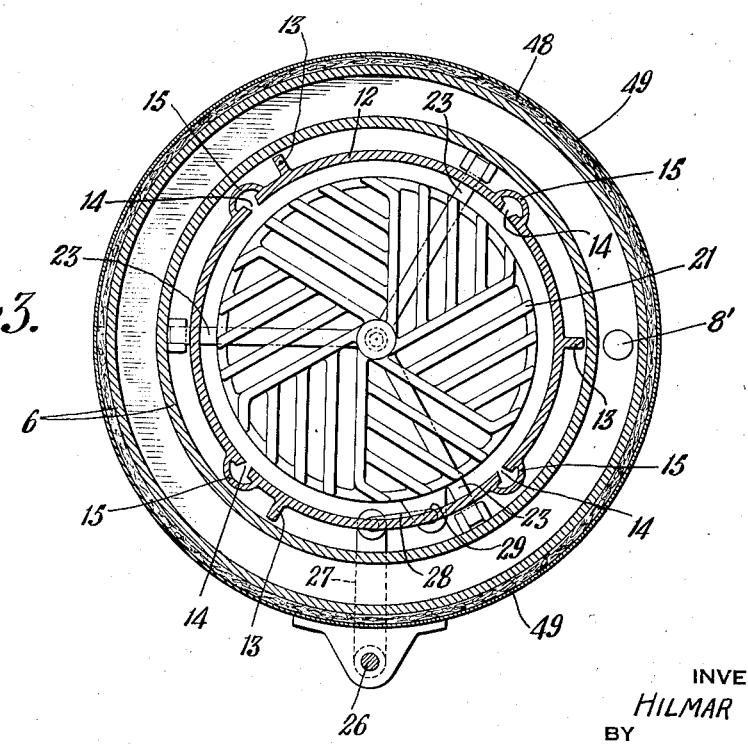
Fig: 3.
INVENTOR
HILMAR R. HAGEN
BY
E. C. Sanborn
ATTORNEY

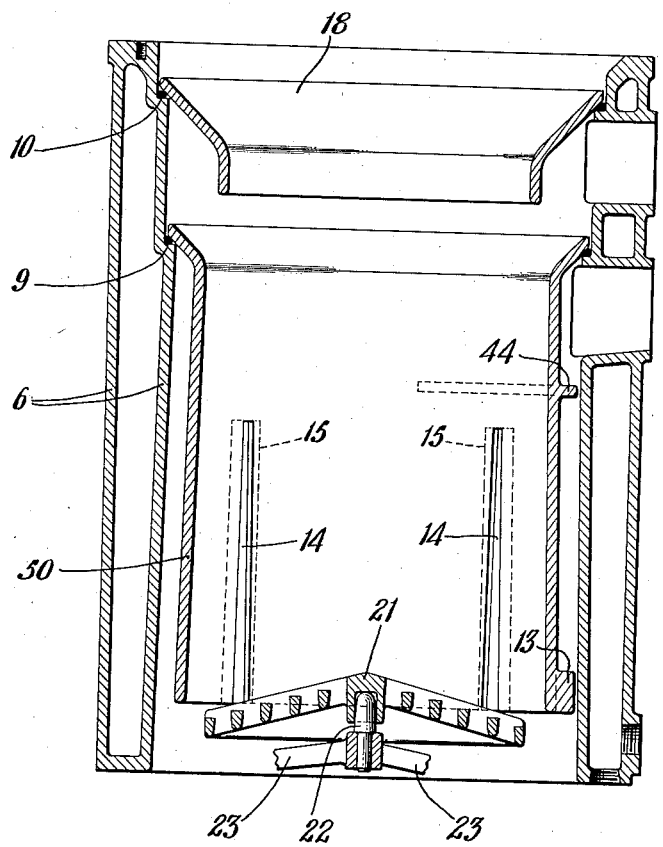

Patented Aug. 6, 1940

2,210,716

UNITED STATES PATENT OFFICE 2,210,716

HEATING APPARATUS

Hilmar R. Hagen, Pottsville, Pa., assignor to The Philadelphia & Reading Coal & Iron Company, Reading, Pa., a corporation of Pennsylvania Application April 8, 1938, Serial No. 200,832

4 Claims. (Cl. 122—30)

This invention relates to solid-fuel-burning apparatus and particularly to an improved construction of fluid heating furnaces in which heat is transferred, principally by radiation, from the burning fuel in a fire pot, across an air space to the fluid to be heated in a jacket, or container, surrounding the fire pot. While the present invention is adaptable to a wide variety of uses it is especially useful in heaters such as may be used for supplying domestic hot water.

The heaters to which the present invention relates, comprise a fire pot and a coal hopper above it, the capacity of both being such that several days', or more, supply of fuel, preferably anthracite, may be placed in the heater at one time. A water jacket with suitable piping connections for the entry of the water to be heated and outlet connections for the heated water, either to the faucets, or a storage tank, surrounds the fire pot and the lower part of the fuel hopper, there being an air space between it and the fire pot. The transfer of heat from the fire pot to the water in the jacket is principally by radiation across the intervening air space.

A feature of the present invention is a fire pot of improved construction for the more effective burning of the fuel therein and which, like the fuel hopper and its discharge member, or throat, may be readily installed, or removed, without disturbance to the water jacket or stack connections. The fire pot and the fuel hopper throat are so constructed and arranged with respect to each other and to the water jacket, as to provide for a controlled draft through the grate and the fuel in the fire pot, such draft, or primary air, being withdrawn between the fire pot and the hopper. The construction used also permits the flow of auxiliary air along the space between the fire pot and the water jacket and into the stack in accordance with the idea of heating principally by radiation and in a manner to give better control of the draft, as more fully described in the copending application of H. J. Rose, Serial No. 78,549, filed May 8, 1936 now Patent No. 2, 151,642, Mar. 21, 1939.

Another feature of the invention is a water jacket extending completely around the fire pot and adapted to support it and also the fuel hopper.

Further advantages of the invention will be apparent from the following description taken in conjunction with the drawings in which Fig. 1 is a vertical sectional view showing a preferred construction;

Figs. 2 and 3 are horizontal sectional views taken substantially along the lines 2—2 and 3—3, respectively, of Fig. 1 and Fig. 4 is a partial vertical sectional view of the grate shaker mechanism.

Fig. 5 is a vertical sectional view showing a modified fire pot construction for the heater illustrated in Figs. 1 to 4.

Referring principally to Fig. 1, it will be seen that the lower part of the heater comprises a base 1 forming the ash receiving compartment and provided with an annular flange 2 at its top edge upon which the water jacket is supported as hereinafter described. The base 1 is also provided with an ash door 3 permitting the removal of the ash receptacle 4. An opening 5 in the base admits air to the fuel bed for combustion and also the auxiliary air which flows in the space between the water jacket and the fire pot. If desired, the escape of ashes or dust through this opening may be restricted by an inside apron, or a grill.

The water jacket 6, which is preferably annular in form comprises spaced inner and outer walls, the latter being provided with an inlet pipe 7 at the bottom for the admission of fluid to be heated and an outlet 8 at the top leading to the faucets, or storage tank. In casting the jacket 6 several core vent holes are made in the flat surface upon which it is to rest when in use. Thereafter these holes may be tapped and fitted with plugs 8' having threaded extensions serving as hold-down bolts as shown in Fig. 1. When it is desired to drain the jacket 6, one or more of the plugs 8' may be removed. In the upper part of the water jacket the inner wall is offset at two different places so as to provide circular flanges, or projections, at 9 and 10 for supporting the fire pot and fuel hopper discharge, respectively, as hereinafter more fully described.

The fire pot 11 is preferably an elongated member of substantially the same form as the inside of the water jacket. In the present embodiment it is cylindrical. The upper edge of the fire pot is flared outwardly as indicated at 12 and the enlarged end thus formed rests upon the flange 9 formed in the water jacket. A gasket of asbestos, or other suitable material, may be interposed so as to form a better seat for the fire pot and also to prevent the escape of any substantial amount of air which would detract somewhat from the efficient operation of the heater. The lower end of the fire pot which terminates at approximately the level of the grate, is provided with three spacing projections 13. These may be short vertical members formed integral with the fire pot and serve to hold the lower end of the fire pot in spaced relation with the water jacket and yet permit the flow of auxiliary air around the outside of the fire pot.

It will be observed that substantially all of the wall of the fire pot is separated from the water jacket, the contact between the two members at flange 9 and projections 13 being relatively slight. It will be readily appreciated that with auxiliary air flowing between the fire pot and the water jacket, the contents of the latter will be heated principally by radiation and not by conduction through the heater members or by convection of the heated gases flowing between the fire pot and the water jacket, as more fully described in the copending application of R. C. Johnson, Serial No. 64,835, filed February 20, 1936 now Patent No. 2,151,516, Mar. 21, 1939.

The diameter of the fire pot has an important bearing on the size of fuel which can be burned most effectively and banked most consistently. The capacity of the fire pot varies as the square of the diameter while the area of the side wall varies as the first power of the diameter. Hence the temperatures in the fire pot are dependent to a considerable degree on its diameter and this affects the proportion of total heat transferred by radiation, the amount of clinkering, the production of carbon monoxide and the over-all efficiency of the apparatus. Draft requirements vary rapidly with the diameter of the fire pot, other factors remaining constant. A large diameter fire pot requires less draft to give the same rating, or permits the use of smaller size fuel with little change in draft requirements or rating.

It has been found that chestnut size anthracite performs excellently in a 12 inch diameter fire pot and is also satisfactory in a 10 inch fire pot. However, the next larger size (stove) cannot be banked entirely satisfactorily in a 10 inch fire pot and tends to die out in the 12 inch size. Pea size anthracite, which is smaller than chestnut, burns well in either the 10 inch or 12 inch fire pots but gives a reduced rating because of increased draft resistance and because the combustion zone is smaller and presents less hot wall area for radiation. A large diameter fire pot has the practical advantage of storing a large amount of coal and ash and of permitting longer intervals between attentions. As a result of numerous experiments, and taking into consideration all the factors mentioned, a fire pot having a diameter of about 12 inches is preferred, when pea and chestnut size anthracite are used, but it has been found that fire pots with diameters of 10 to 14 inches will give fairly satisfactory results.

The depth of the fuel bed in the fire pot is also a factor to be considered. The amount of coal and ash that can be stored therein is proportional to its depth. The draft requirements are also affected by the depth of the fire pot. Since a fuel bed loses heat by radiation, not only from the side walls, but also from the top and bottom of the bed, a deep bed is hotter at the center than a shallow bed. This factor also affects clinkering, carbon monoxide production and overall efficiency. Preferably the depth of the fire pot is somewhat greater than its diameter. Thus, for example, for the diameters given, the fire pot may be approximately 20 inches deep.

The fire pot may have substantially vertical sides, as shown in Fig. 1. However, it has been found that fire pots having a slight downward flare, so that the diameter at the bottom is slightly greater than at the top, give improved results. Such a construction is illustrated in Fig. 5, in which the fire pot 50 flares downwardly and outwardly from the top to the bottom. In the combustion of some varieties of anthracite a fine ash is produced which packs together and offers more than average resistance to the flow of air through the fuel bed, thus requiring the shaking of the grate more frequently to clear the bed of ashes. Such coal may be burned with greater advantage in a fire bed having a downward flare because of the increased possibility of air diffusing up around the edges of the fire pot where the ash is less compact.

The fire pot preferably has a plurality of vertical slots, or tuyeres, distributed around its circumference. As shown in the drawings there are four tuyeres 14 equally spaced around the fire bed and extending upwardly a substantial distance from the lower edge of the fire pot. As shown, these tuyeres are preferably slightly wider at the bottom of the fire pot and, as shown more clearly in Fig. 3, may be slightly wider at their outermost edges. Shaping the slots in this manner helps to prevent clogging with ashes. Air may be supplied to these tuyeres through the passages 15 extending to the lower edge of the fire pot as illustrated. The provision of such tuyeres greatly increases the amount of coal which can be burned without shaking the grate. In some instances the increase has amounted to approximately 40%. The performance of certain coals having a soft fine ash, which would otherwise interfere with air supply, has been greatly improved by the provision of such tuyeres.

The fuel magazine, or hopper, 16 rests on top of the water jacket and may be secured thereto by a clamp 17. The discharge member, or throat, 18, may have inwardly sloping sides leading to a discharge orifice located slightly above the top of the fire pot. The throat 18 may also be supported from the flange 10 as previously described in connection with the fire pot. The hopper 16 is provided with a tightly fitting lid 19 so as to prevent the leakage of combustion gases into the room and as illustrated, the lid may be provided with an asbestos gasket and a toggle latch 20 is used to insure a tight fit which is easily attained.

It will be observed that the area of the discharge opening of the hopper is almost as large as the cross-sectional area of the fire pot 11. When such a wide discharge opening is used the extra weight of coal in the magazine or hopper, has a very noticeable effect in pressing down the fuel in the fire pot, and compacting the ashes, thus making room for additional fuel. When a small discharge opening is used, the area of the fire pot on which the weight of fuel in the magazine presses is much reduced and the friction of the fuel on the sides of the throat and the tendency of the fuel to bridge across the throat eliminates a substantial part of the downward pressure. Tests have indicated that a large hopper throat may increase the amount of fuel which can be burned between rakings, as much as 35%.

A preferred grate construction is illustrated in the drawings. The grate 21 is of circular design with a conical upper surface and semi-spiral grate bars and is supported upon a centrally located pin 22 carried on the end of the arms 23. The latter may be carried by brackets secured between the base flange 2 and the bottom of the water jacket 11, as shown clearly in Fig. 1.

A preferred mechanism for shaking the grate 21 is illustrated in Fig. 4. When it is desired to shake the grate the handle 24, which is pivoted at 25 near the upper end of the vertical rod 26, is raised to a horizontal position. This handle is then oscillated in a horizontal plane and transmits a corresponding movement through the rod 26 to the arm 27 secured to the lower end thereof. This arm projects through an opening in the base 1 and carries at its inner end a Z-shaped rod 28 extending through a hole 29 in a grate. It will be apparent that the oscillation of the grate handle 24 causes the grate 21 to oscillate on its supporting pin 22.

The air for combustion enters through the opening 5 in the base and passes through the grate 21 and the fuel in the fire pot. When the damper 40 is open, the air flows through passage 41 and up the stack 42. The auxiliary air also enters through the opening 5 but it passes along the space between the fire pot 11 and the water jacket 6 thence through the passage 43 to the stack 42. A baffle 44 extends part way around the fire pot 11 as illustrated, and insures better distribution of the secondary air around the fire pot. The damper 40 and also the damper 45 in the side of the stack are actuated by the thermostatic controls 46 and 47, respectively, located in the water jacket and operating in accordance with variations of temperature of the water. For a more complete description of these controls reference may be had to my copending application, Serial No. 193,838, filed March 4, 1938 now Patent No. 2,151,512, Mar. 21, 1939.

The outside of the water jacket 6 may be covered with insulating material 48 and also with a metal casing 49 for protective purposes. The latter may be coated with a suitable metal foil, or otherwise treated, further to reduce heat loss and to improve its appearance.

It will be understood that the invention herein described is not limited to the details of form and arrangements of parts set forth for various changes may be made without departing from the spirit and scope of the present invention.

I claim:

1. In fluid-heating apparatus, a cylinder having inner and outer walls between which the fluid is heated, a fire pot in said cylinder and provided with an enlarged upper portion adapted to rest on projections near the upper end of said inner wall to removably support the fire pot, the remaining parts of the latter being spaced away from said inner wall to permit the passage of air therebetween from below the fire pot and an outlet conduit leading from said space below the level of said enlarged portion and near the top of the fire pot.

2. Heating apparatus comprising a double-walled jacket adapted to contain fluid to be heated between the walls thereof, a solid-fuel-burning fire pot removably supported inside said jacket and having a plurality of openings in the side thereof for the admission of air, and longitudinal conduits for leading air upwardly from the lower edge of said fire pot to said openings.

3. In fluid-heating apparatus, a double-walled annular chamber adapted to contain the fluid to be heated between the walls thereof, a solid-fuel-burning fire pot removably supported inside, and in spaced relation to, said member, the lower portion of said fire pot having a cross-sectional area increasing downwardly, a plurality of openings in the side of said fire pot for the admission of air, and longitudinal conduits for leading air upwardly from the lower edge of said fire pot to said openings.

4. A fluid-heater comprising a member having inner and outer walls between which the fluid is heated, a fire pot removably supported inside said member and provided with an enlarged upper end adapted to contact projections on said inner wall to support the fire pot in spaced relation thereto, a plurality of projections at the lower end of said fire pot of relatively short vertical length adaped to space the lower end of the fire pot from said inner wall, and conduits for causing a stream of air to flow through said fire pot for combustion and to carry away the products of combustion and for causing another stream of air to flow from below the lower edge of the fire pot between said lower edge and said inner wall and upwardly between the fire pot and said inner wall to assist in radiation control.

HILMAR R. HAGEN.